(12) United States Patent
Yamazaki et al.

(10) Patent No.: US 10,490,820 B2
(45) Date of Patent: Nov. 26, 2019

(54) POSITIVE-ELECTRODE PLATE FOR NON-AQUEOUS ELECTROLYTE SECONDARY BATTERY, NON-AQUEOUS ELECTROLYTE SECONDARY BATTERY, AND METHOD OF PRODUCING NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Nobuyuki Yamazaki, Toyota (JP); Masanori Kitayoshi, Toyota (JP); Takashi Miura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 341 days.

(21) Appl. No.: 15/090,122

(22) Filed: Apr. 4, 2016

(65) Prior Publication Data
US 2016/0293962 A1 Oct. 6, 2016

(30) Foreign Application Priority Data
Apr. 6, 2015 (JP) ................................. 2015-077551

(51) Int. Cl.
*H01M 4/139* (2010.01)
*H01M 4/62* (2006.01)
(Continued)

(52) U.S. Cl.
CPC ......... *H01M 4/628* (2013.01); *H01M 4/0404* (2013.01); *H01M 4/13* (2013.01);
(Continued)

(58) Field of Classification Search
None
See application file for complete search history.

(56) References Cited

U.S. PATENT DOCUMENTS

2007/0243468 A1* 10/2007 Ryu .................... H01M 2/1686
429/231.95
2008/0020283 A1* 1/2008 Miyashiro ............. B82Y 30/00
429/322
(Continued)

FOREIGN PATENT DOCUMENTS

JP 2014-103098 A 6/2014
JP 2015-015169 A 1/2015
(Continued)

*Primary Examiner* — Yoshitoshi Takeuchi
(74) *Attorney, Agent, or Firm* — Sughrue Mion, PLLC

(57) ABSTRACT

In a positive-electrode active material layer of a positive-electrode plate for a non-aqueous electrolyte secondary battery, a dispersion index value C determined from a small-size-particle ratio A and a coefficient B of variation and expressed by an expression, $C=B/A^3$, is 0.8 or less. The small-size-particle ratio A is a ratio of the number of small-size-particle-containing spots where a detected intensity of phosphorus is equal to or lower than a detected density of trilithium phosphate having a particle size of 1 μm or less, to the number of phosphorus-containing spots among the analyzed spots. The coefficient B of variation is a ratio of a standard deviation of segmented-region accumulated values to an arithmetic mean of the segmented-region accumulated values each of which is the sum of detected intensities in the phosphorus-containing spots in a corresponding one of the segmented regions obtained through segmentation of the analyzed region.

5 Claims, 9 Drawing Sheets

(51) Int. Cl.
- *H01M 4/13* (2010.01)
- *H01M 4/04* (2006.01)
- *H01M 10/052* (2010.01)
- *H01M 4/02* (2006.01)

(52) U.S. Cl.
CPC ......... *H01M 4/139* (2013.01); *H01M 10/052* (2013.01); *H01M 2004/021* (2013.01); *H01M 2004/028* (2013.01)

(56) References Cited

U.S. PATENT DOCUMENTS

| | | | |
|---|---|---|---|
| 2009/0081546 A1* | 3/2009 | Ogasawara | H01M 4/483 429/218.1 |
| 2010/0151335 A1* | 6/2010 | Senga | H01B 1/122 429/322 |
| 2010/0173197 A1* | 7/2010 | Li | C01G 45/1228 429/220 |
| 2013/0219704 A1* | 8/2013 | Haugseter | H01M 4/364 29/623.5 |
| 2015/0180036 A1 | 6/2015 | Takebayashi | |
| 2016/0211520 A1 | 7/2016 | Takebayashi | |

FOREIGN PATENT DOCUMENTS

| | | |
|---|---|---|
| JP | 2015-46350 A | 3/2015 |
| WO | 2015/028869 A1 | 3/2015 |

\* cited by examiner

POSITIVE-ELECTRODE PLATE FOR NON-AQUEOUS ELECTROLYTE SECONDARY BATTERY, NON-AQUEOUS ELECTROLYTE SECONDARY BATTERY, AND METHOD OF PRODUCING NON-AQUEOUS ELECTROLYTE SECONDARY BATTERY

INCORPORATION BY REFERENCE

The disclosure of Japanese Patent Application No. 2015-077551 filed on Apr. 6, 2015 including the specification, drawings and abstract is incorporated herein by reference in its entirety.

BACKGROUND OF THE INVENTION

1. Field of the Invention

The invention relates to a positive-electrode plate for a non-aqueous electrolyte secondary battery, a non-aqueous electrolyte secondary battery including the positive-electrode plate, and a method of producing the non-aqueous electrolyte secondary battery.

2. Description of Related Art

There have been demands for lithium-ion secondary batteries with improved performance, such as, higher-power lithium-ion secondary batteries and higher-capacity lithium-ion secondary batteries. From the viewpoint of producing high-performance lithium-ion secondary batteries, active materials with a high electric potential, such as Ni—Mn spinel-based materials, have drawn attention as positive-electrode active materials. This is because using positive-electrode active materials with a high electric potential leads to a raise in the operating voltage of lithium-ion secondary batteries.

In a lithium-ion secondary battery, as the operating voltage thereof becomes higher, decomposition of an electrolyte is more likely to occur with charging and discharging of the lithium-ion secondary battery. In the lithium-ion secondary battery in which acid is generated due to decomposition of the electrolyte, a transition metal may be eluted from a positive-electrode active material due to the acid. When the transition metal is eluted from the positive-electrode active material, the capacity maintenance ratio of the lithium-ion secondary battery is lowered.

For example, Japanese Patent Application Publication No. 2014-103098 (JP 2014-103098 A) describes a non-aqueous electrolyte secondary battery including a positive-electrode active material layer that contains a positive-electrode active material with a high electric potential and trilithium phosphate ($Li_3PO_4$). According to JP 2014-103098 A, trilithium phosphate contained in the positive-electrode active material layer makes it possible to prevent elution of a transition metal from the positive-electrode active material with charging and discharging of the non-aqueous electrolyte secondary battery. Specifically, trilithium phosphate is reacted with hydrofluoric acid (HF) generated in the electrolyte, thereby functioning as an acid-consuming material. This makes it possible to inhibit elution of the transition metal from the positive-electrode active material, thereby enhancing the durability of the non-aqueous electrolyte secondary battery.

In order to allow trilithium phosphate contained in the positive-electrode active material layer to appropriately react with hydrofluoric acid, trilithium phosphate needs to be present near the sites where hydrofluoric acid is generated. In other words, it is desirable that trilithium phosphate be appropriately distributed without imbalances in the positive-electrode active material layer. However, in the foregoing related art, the distribution of trilithium phosphate in the positive-electrode active material layer is not appropriate in some cases. In these cases, trilithium phosphate is not present in many of the sites where hydrofluoric acid is generated. As a result, there is a large amount of hydrofluoric acid that does not react with trilithium phosphate.

SUMMARY OF THE INVENTION

The invention provides a positive-electrode plate for a non-aqueous electrolyte secondary battery, the positive electrode plate including a positive-electrode active material layer in which trilithium phosphate is appropriately distributed. The invention also provides the non-aqueous electrolyte secondary battery, and a method of producing the non-aqueous electrolyte secondary battery.

A first aspect of the invention relates to a positive-electrode plate for a non-aqueous electrolyte secondary battery, the positive-electrode plate including a positive-electrode collector foil, and a positive-electrode active material layer provided on a surface of the positive-electrode collector foil. The positive-electrode active material layer contains a positive-electrode active material, a binder, and trilithium phosphate. The positive-electrode active material layer exhibits a dispersion index value C of 0.8 or less. The dispersion index value C is determined based on a small-size-particle ratio A and a coefficient B of variation that are obtained from results of analysis on phosphorus (P) performed by an electron probe microanalyzer (EPMA) at a plurality of analyzed spots in an analyzed region of the positive-electrode active material layer, and the dispersion index value C is expressed by an expression, $C=B/A^3$. The small-size-particle ratio A is a ratio of the number of small-size-particle-containing spots to the number of phosphorus-containing spots. The phosphorus-containing spots are spots where phosphorus is present among the plurality of analyzed spots. The small-size-particle-containing spots are spots where a detected intensity of phosphorus is equal to or lower than a threshold intensity among the phosphorus-containing spots. The threshold intensity is a detected intensity of particles of trilithium phosphate having a particle size of 1 µm. The coefficient B of variation is a ratio of a standard deviation of a plurality of segmented-region accumulated values to an arithmetic mean of the plurality of segmented-region accumulated values. Each of the segmented-region accumulated values is the sum of detected intensities of phosphorus in the phosphorus-containing spots in a corresponding one of segmented regions that are obtained by dividing the analyzed region such that each of the segmented regions includes at least one of the analyzed spots.

The positive-electrode active material layer of the positive-electrode plate exhibits a dispersion index value C of 0.8 or less. Thus, in the positive-electrode active material layer, the proportion of small particles of the trilithium phosphate is high and the trilithium phosphate is evenly distributed. That is, the positive-electrode plate has the positive-electrode active material layer in which the trilithium phosphate is appropriately distributed.

The particles of the trilithium phosphate contained in the positive-electrode active material layer may have a mean particle size of 1.5 µm or less. The particles of the trilithium phosphate having a mean particle size of 1.5 µm or less are appropriately dispersed in the positive-electrode paste for forming the positive-electrode active material layer. Thus, the positive-electrode active material layer in which the trilithium phosphate is appropriately distributed is formed.

The positive-electrode active material may be a positive-electrode active material with a maximum operating electric potential of 4.35 V or higher with respect to an electric potential of metallic lithium. When the maximum operating electric potential of the positive-electrode active material is 4.35 V or higher with respect to the electric potential of metallic lithium, a large amount of hydrofluoric acid is likely to be generated in the battery including the positive-electrode plate. Thus, it is possible to more reliably obtain the effect of increasing the reaction frequency with which hydrofluoric acid and the trilithium phosphate react with each other due to appropriate distribution of the trilithium phosphate in the positive-electrode active material layer, and it is also possible to raise the electric potential of the battery.

The coefficient B of variation may be set on conditions that each of the segmented regions has a rectangular shape and a length of each of sides of each of the segmented regions having a rectangular shape is set to a value within a range from half a mean particle size of the positive-electrode active material to five times the mean particle size of the positive-electrode active material. When the dispersion index value C calculated from the coefficient B of variation calculated based on such a segmented region is 0.8 or less, there is a high probability that trilithium phosphate is present around the positive-electrode active material in the positive-electrode active material layer. That is, the distribution of trilithium phosphate in the positive-electrode active material layer is a distribution at which trilithium phosphate and hydrofluoric acid generated near the surface of the positive-electrode active material appropriately react with each other.

A second aspect of the invention relates to a non-aqueous electrolyte secondary battery including a positive-electrode plate, a negative-electrode plate, a non-aqueous electrolyte containing a fluorine-containing ionic compound, and a battery case in which the positive-electrode plate, the negative-electrode plate, and the electrolyte are accommodated. The positive-electrode plate is the positive-electrode plate according to the first aspect.

A third aspect of the invention relates to a method of producing a non-aqueous electrolyte secondary battery including a positive-electrode plate, a negative-electrode plate, a non-aqueous electrolyte containing a fluorine-containing ionic compound, and a battery case in which the positive-electrode plate, the negative-electrode plate, and the electrolyte are accommodated, the positive-electrode plate including a positive-electrode collector foil and a positive-electrode active material layer provided on a surface of the positive-electrode collector foil, the method comprising. The includes: producing a positive-electrode paste by dispersing a positive-electrode active material, a binder, and particles of trilithium phosphate having a mean particle size of 1.5 μm or less in a solvent; producing the positive-electrode plate by applying the positive-electrode paste to the surface of the positive-electrode collector foil and drying the positive-electrode paste applied to the surface of the positive-electrode collector foil to form the positive-electrode active material layer; assembling the non-aqueous electrolyte secondary battery by accommodating the non-aqueous electrolyte, the positive-electrode plate, and the negative-electrode plate in the battery case; and performing initial charging on the assembled non-aqueous electrolyte secondary battery.

When the positive-electrode paste is produced, the use of trilithium phosphate having a mean particle size of 1.5 μm or less makes it possible to produce the positive-electrode paste in which trilithium phosphate is appropriately dispersed. Thus, the use of the positive-electrode paste makes it possible to produce the positive-electrode plate including the positive-electrode active material layer in which trilithium phosphate is appropriately distributed.

A positive-electrode active material with a maximum operating electric potential of 4.35 V or higher with respect to an electric potential of metallic lithium may be used as the positive-electrode active material. When the maximum operating electric potential of the positive-electrode active material is 4.35 V or higher with respect to the electric potential of metallic lithium, a large amount of hydrofluoric acid is likely to be generated in the battery including the positive-electrode plate. Thus, it is possible to more reliably obtain the effect of increasing the reaction frequency with which hydrofluoric acid and the trilithium phosphate react with each other due to appropriate distribution of the trilithium phosphate in the positive-electrode active material layer, and it is also possible to raise the electric potential of the battery.

The trilithium phosphate in a form of powder may be mixed with the solvent and pulverizing or disintegrating particles of the trilithium phosphate in the solvent, to produce a trilithium phosphate-containing paste. The positive-electrode paste may be produced from the trilithium phosphate-containing paste. Pulverization or disintegration of the trilithium phosphate in the solvent makes it possible to produce the trilithium phosphate-containing paste in which trilithium phosphate is appropriately dispersed in the solvent. The use of the trilithium phosphate-containing paste makes it possible to produce the positive-electrode paste in which trilithium phosphate is appropriately dispersed.

The invention provides a positive-electrode plate for a non-aqueous electrolyte secondary battery, the positive-electrode plate including a positive-electrode active material layer in which trilithium phosphate is appropriately distributed. The invention also provides the non-aqueous electrolyte secondary battery and a method of producing the non-aqueous electrolyte secondary battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
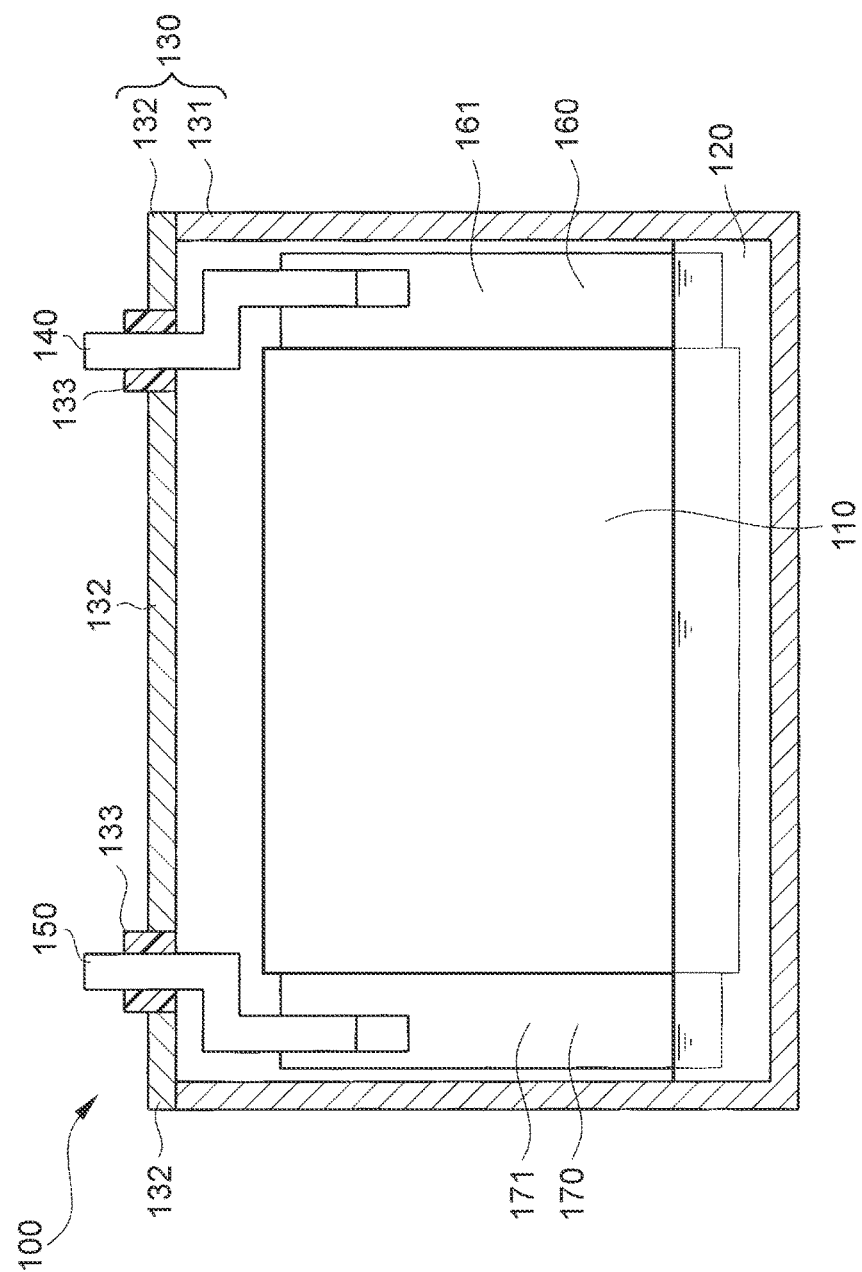
FIG. 1 is a sectional view of a battery according to an embodiment.

First, a battery 100 (see FIG. 1) according to a first embodiment will be described. FIG. 1 is a sectional view of the battery 100 according to the first embodiment. As illustrated in FIG. 1, the battery 100 is a lithium-ion secondary battery obtained by accommodating an electrode assembly 110 and an electrolyte 120 inside a battery case 130. The battery case 130 includes a case body 131 and a case lid 132. The case lid 132 is provided with insulators 133.

The electrolyte 120 in the present embodiment is a non-aqueous electrolyte produced by dissolving a lithium salt in an organic solvent. Specifically, as the organic solvent, which is a non-aqueous solvent, in the electrolyte 120 in the present embodiment, a mixture of ethylene carbonate (EC), dimethyl carbonate (DMC), and ethyl methyl carbonate (EMC) is used. Note that another kind of non-aqueous solvent may be used as the organic solvent.

As the lithium salt in the electrolyte 120 in the present embodiment, lithium hexafluorophosphate ($LiPF_6$), which is a fluorine-containing compound, is used. That is, the electrolyte 120 is a non-aqueous electrolyte containing a fluorine-containing ionic compound. Note that, instead of $LiPF_6$, for example, $LiBF_4$, $LiAsF_6$, $LiCF_3SO_3$, $LiC_4F_9SO_3$, $LiN(CF_3SO_2)_2$, or $LiC(CF_3SO_2)_3$ may be used as the lithium salt. Further, two or more kinds of the foregoing lithium salts may be used in combination. Alternatively, $LiClO_4$ or $LiI$ may be used in addition to the foregoing lithium salts.

Figure 2:
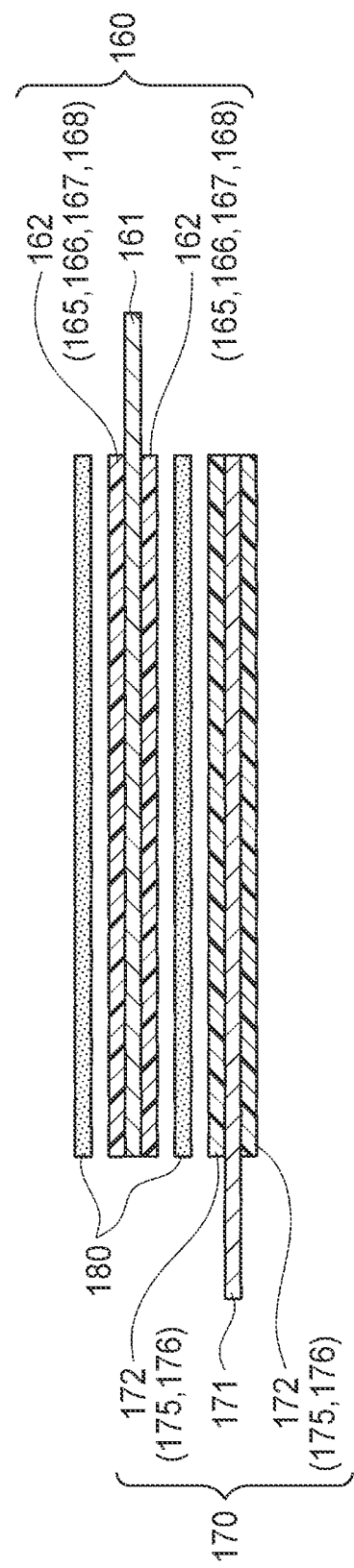
FIG. 2 is a sectional view illustrating structural components, such as a positive-electrode plate, used in the battery according to the embodiment.

FIG. 2 is a sectional view of a positive-electrode plate 160, a negative-electrode plate 170, and separators 180 that constitute the electrode assembly 110. Each of the positive-electrode plate 160, the negative-electrode plate 170, and the separators 180 is in the form of a sheet extending in a direction that is perpendicular to the sheet on which FIG. 2 is drawn and that is away from a person who sees FIG. 2. The electrode assembly 110 is obtained by laminating the positive-electrode plate 160, the negative-electrode plate 170, and the separators 180 as illustrated in FIG. 2, and rolling this laminate around a rolling axis extending in the right-left direction in FIG. 2 to turn the laminate into a flat shape.

As illustrated in FIG. 2, the positive-electrode plate 160 is obtained by forming a positive-electrode active material layer 162 on each of both surfaces of a positive-electrode collector foil 161 The positive-electrode collector foil 161 may be an aluminum foil. Each positive-electrode active material layer 162 in the present embodiment contains a positive-electrode active material 165, a conductive aid 166, a binder 167, and trilithium phosphate 168.

The positive-electrode active material 165 is a component that contributes to charging and discharging in the battery 100, and can store and release lithium ions. In the present embodiment, the positive-electrode active material 165 is a positive-electrode active material with a maximum operating electric potential of 4.35 V or higher with respect to an electric potential of metallic lithium (Li). Examples of such a positive-electrode active material 165 include a positive-electrode active material having a spinel structure and containing nickel (Ni) and manganese (Mn). In the present embodiment, as the positive-electrode active material 165, $LiNi_{0.5}Mn_{1.5}O_4$ is used.

The conductive aid 166 enhances the conductivity of the positive-electrode active material layer 162. The binder 167 forms the positive-electrode active material layer 162 by binding the materials contained in the positive-electrode active material layer 162 together, and binds the positive-electrode active material layer 162 onto the surface of the positive-electrode collector foil 161. As the conductive aid 166, for example, acetylene black (AB) may be used. As the binder 167, for example, PolyVinylidene DiFluoride (PVDF) may be used. The trilithium phosphate 168 functions as an acid-consuming material, and forms a protective coating film on the surface of the positive-electrode active material 165. This will be described later in detail.

As illustrated in FIG. 2, the negative-electrode plate 170 is obtained by forming a negative-electrode active material layer 172 on each of both surfaces of a negative-electrode collector foil 171 The negative-electrode collector foil 171 may be a copper foil. Each negative-electrode active material layer 172 in the present embodiment contains a negative-electrode active material 175 and a binder 176.

The negative-electrode active material 175 is a component that contributes to charging and discharging of the battery 100, and can store and release lithium ions. The binder 176 forms the negative-electrode active material layer 172 by binding the materials contained in the negative-electrode active material layer 172 together, and binds the negative-electrode active material layer 172 onto the surface of the negative-electrode collector foil 171. As the negative-electrode active material 175, for example, natural graphite may be used. As the binder 176, for example, styrene-butadiene rubber (SBR) may be used.

As illustrated in FIG. 2, the positive-electrode plate 160 has a portion where no positive-electrode active material layer 162 is formed and thus the positive-electrode collector foil 161 is exposed. Similarly, the negative-electrode plate 170 has a portion where no negative-electrode active material layer 172 is formed and thus the negative-electrode collector foil 171 is exposed.

The right end portion of the rolled electrode assembly 110 illustrated in FIG. 1 is constituted only by the exposed portion of the positive-electrode collector foil 161 of the positive-electrode plate 160. Similarly, the left end portion of the rolled electrode assembly 110 illustrated in FIG. 1 is constituted only by the exposed portion of the negative-electrode collector foil 171 of the negative-electrode plate 170.

As illustrated in FIG. 1, a positive-electrode terminal 140 is connected to the right end portion of the electrode assembly 110, which is constituted by the exposed portion of the positive-electrode collector foil 161, and a negative-electrode terminal 150 is connected to the left end portion of the electrode assembly 110, which is constituted by the exposed portion of the negative-electrode collector foil 171. The end portions of the positive-electrode terminal 140 and negative-electrode terminal 150, which are not connected to the electrode assembly 110, extend through the insulators 133 to project to the outside of the battery case 130.

As illustrated in FIG. 2, the central portion of the electrode assembly 110 in FIG. 1 is a portion where a portion of the positive-electrode plate 160, on which the positive-electrode active material layers 162 are formed, and a portion of the negative-electrode plate 170, on which the negative-electrode active material layers 172 are formed, are laminated with the separator 180 provided therebetween. The battery 100 performs charging and discharging at the central portion of the electrode assembly 110, through the positive-electrode terminal 140 and the negative-electrode terminal 150.

Figure 3:
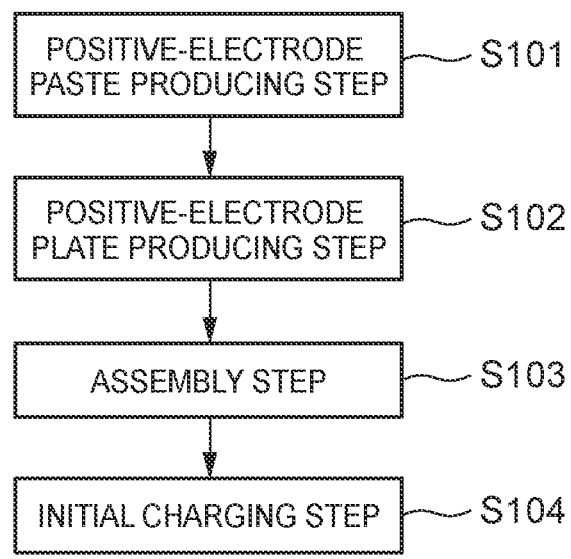
FIG. 3 is a flowchart illustrating the procedure for producing the battery according to the embodiment.

Next, a method of producing the battery 100 according to the present embodiment will be described. FIG. 3 illustrates the procedure for producing the battery 100 according to the present embodiment. As illustrated in FIG. 3, the battery 100 according to the present embodiment is produced through a positive-electrode paste producing step (S101), a positive-electrode plate producing step (S102), an assembly step (S103), and an initial charging step (S104).

First, the positive-electrode paste producing step (S101) will be described. In the positive-electrode paste producing step, a positive-electrode paste used to form the positive-electrode active material layers 162 of the positive-electrode plate 160 is produced. The aforementioned components contained in the positive-electrode active material layer 162, that is, the positive-electrode active material 165, the conductive aid 166, the binder 167, and the trilithium phosphate 168 are used to produce the positive-electrode paste. The positive-electrode paste is produced by dispersing these materials in a solvent. As the solvent, N-methylpyrrolidone (NMP) may be used. The positive-electrode paste producing step will be described later in detail.

Next, the positive-electrode plate producing step (S102) is performed. In the positive-electrode plate producing step, the positive-electrode active material layers 162 are formed from the positive-electrode paste produced in the positive-electrode paste producing step. That is, the positive-electrode plate 160 is produced by forming the positive-electrode active material layers 162 on the surfaces of the positive-electrode collector foil 161.

Specifically, the positive-electrode paste is applied to a region of each surface of the positive-electrode collector foil 161, on which the positive-electrode active material layer 162 is to be formed. The applied positive-electrode paste is then dried to remove the solvent from the paste. Thus, the positive-electrode active material layers 162 are formed on the surfaces of the positive-electrode collector foil 161.

When the positive-electrode paste is dried, the materials, such as the positive-electrode active material 165, contained in the positive-electrode paste are bound together with the binder 167. In this way, the positive-electrode active material layers 162 are formed. Further, the positive-electrode active material layers 162 are bound onto the positive-electrode collector foil 161. In this way, the positive-electrode plate 160 is produced.

Next, the assembly step (S103) is performed. In the assembly step, first, the electrode assembly 110 is produced. Specifically, the electrode assembly 110 is produced by laminating the positive-electrode plate 160 produced in the positive-electrode plate producing step and the negative-electrode plate 170 with the separator 180 interposed therebetween, and rolling this laminate into a flat shape. As the material of the separator 180, polypropylene (PP), polyethylene (PE) or the like may be used alone, or a composite material including multiple layers of these materials may be used.

The negative-electrode plate 170 is made of a material different from that of the positive-electrode plate 160, and can be produced by substantially the same method as that of producing the positive-electrode plate 160. Specifically, a negative-electrode paste is produced by dispersing the negative-electrode active material 175 and the binder 176 in a solvent, and the negative-electrode paste is applied to the negative-electrode collector foil 171.

The applied negative-electrode paste is then dried to form the negative-electrode active material layers 172. In this way, the negative-electrode plate 170 including the negative-electrode active material layers 172 provided on the surfaces of the negative-electrode collector foil 171 is produced.

Next, the electrode assembly 110 is accommodated in the case body 131 of the battery case 130 through the opening of the case body 131. The opening of the case body 131 is closed with the case lid 132, and the case body 131 and the case lid 132 are joined together. The positive-electrode terminal 140 and the negative-electrode terminal 150 are connected to the electrode assembly 110 before the electrode assembly 110 is accommodated in the case body 131. The battery case 130, the positive-electrode terminal 140, the negative electrode terminal 150 may be joined to the electrode assembly 110, for example, by welding.

In the assembly step, the electrolyte 120 is also accommodated in the battery case 130. The electrolyte 120 may be accommodated in the case body 131 through, for example, the opening of the case body 131. Alternatively, an injection hole that communicates with the inside and outside of the battery case 130 may be provided, and the electrolyte 120 may be injected into the battery case 130 through the injection hole. The injection hole is sealed after injection of the electrolyte 120. Thus, the battery 100 is assembled in the assembly step.

Next, the initial charging step (S104) is performed. In the initial charging step, the initial charging of the battery 100, which is assembled in the assembly step, is performed. The battery 100 is produced by performing the initial charging step.

Figure 4:
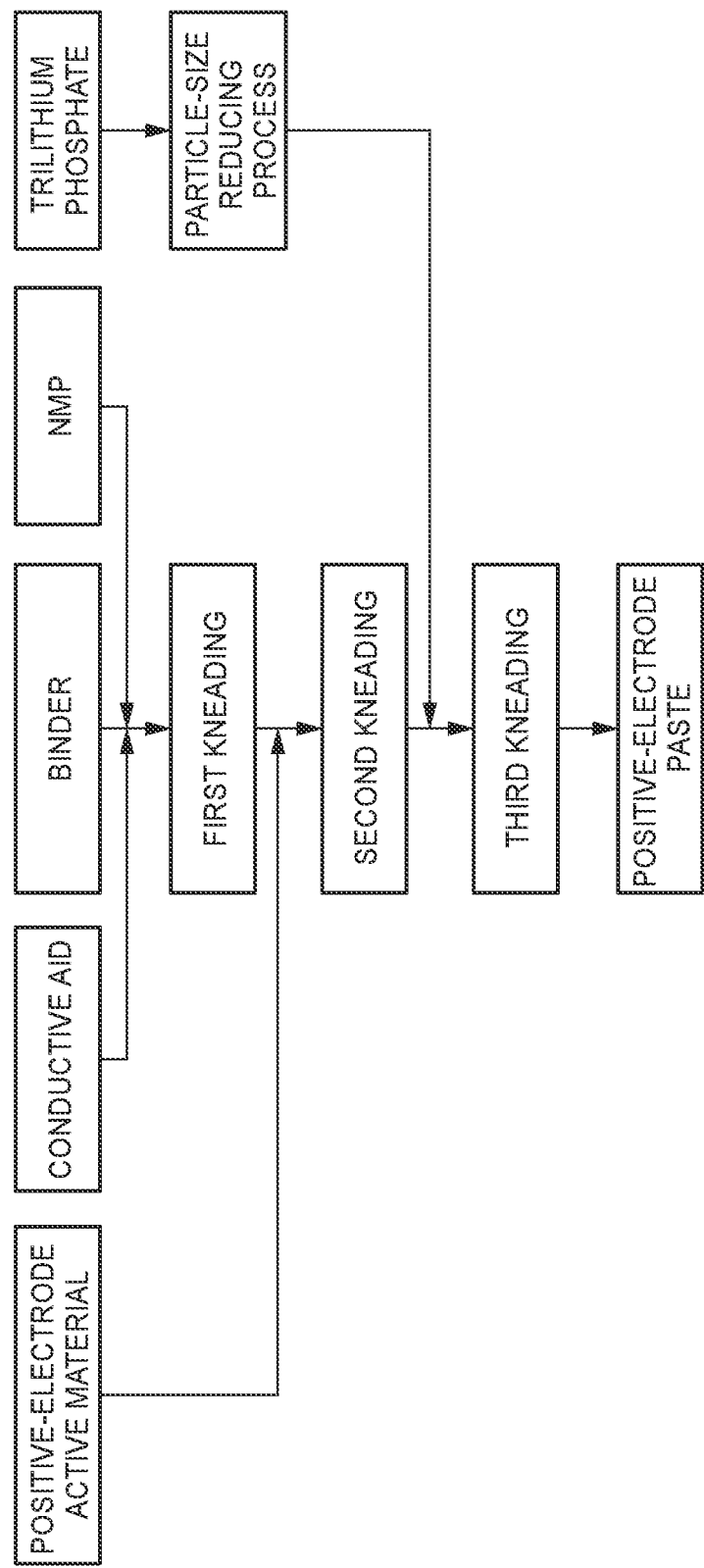
FIG. 4 is a diagram illustrating the procedure of a positive-electrode paste producing step according to a first embodiment.

The positive-electrode paste producing step (S101 in FIG. 3) in the present embodiment will be described in more detail. FIG. 4 illustrates the procedure of the positive-electrode paste producing step. As illustrated in FIG. 4, in the positive-electrode paste producing step, first, the positive-electrode active material 165, the conductive aid 166, the binder 167, and the trilithium phosphate 168 used in the positive-electrode paste are provided. Each of the positive-electrode active material 165, the conductive aid 166, the binder 167, and the trilithium phosphate 168 is in the form of powder.

Then, the conductive aid 166 and the binder 167, both of which are in the form of powder, are mixed with NMP serving as a solvent, and first kneading is performed. Through the first kneading, a paste in which the conductive aid 166 and the binder 167 are dispersed in NMP is produced.

Next, the positive-electrode active material 165 in the form of powder is mixed with the paste produced through the first kneading, and second kneading is performed. Through the second kneading, a paste in which the positive-electrode active material 165, the conductive aid 166, and the binder 167 are dispersed in NMP is produced. In the present embodiment, as the positive-electrode active material 165, a material having a mean particle size D50 of 5 μm is used. The mean particle size D50 of the positive-electrode active material 165 is expressed by a median size, that is, a particle size at an accumulated value of 50% in a particle size distribution obtained by the laser diffraction scattering method.

The trilithium phosphate 168 in the form of powder is mixed with the paste produced through the second kneading, and third kneading is performed. As illustrated in FIG. 4, the trilithium phosphate 168 in the form of powder, which is mixed with the paste, has been subjected to a particle-size reducing process. In the particle-size reducing process in the present embodiment, the particles of the trilithium phosphate 168 in the form of powder are disintegrated or pulverized in a dry state.

Multiple particles of the trilithium phosphate 168 in the form of powder may cling together into agglomerations before the particle-size reducing process is performed, or the particles of the trilithium phosphate 168 before the particle-size reducing process may be excessively large. The particle-size reducing process in the present embodiment is performed in order to adjust the mean particle size D50 of the particles of the trilithium phosphate 168 in the form of powder to 1.5 μm or less. Specifically, the particle-size reducing process in the present embodiment may be performed with the use of a dry atomization unit, such as a dry bead mill.

In the present embodiment, the trilithium phosphate 168 is trilithium phosphate of which the mean particle size D50 is adjusted to 1.5 μm or less through the particle-size reducing process. The mean particle size D50 of the trilithium phosphate 168 is expressed by a median size, that is, a particle size at an accumulated value of 50% in a particle size distribution obtained by the laser diffraction scattering method.

Then, through the third kneading, a positive-electrode paste in which the positive-electrode active material 165, the conductive aid 166, the binder 167, and the trilithium phosphate 168 are dispersed in NMP is produced. In the positive-electrode paste producing step, the first kneading, the second kneading, and the third kneading need not be performed independently from each other. That is, the first kneading, the second kneading, and the third kneading may be performed with the use of a kneader while the materials are sequentially supplied into the kneader. Kneading in the positive-electrode paste producing step may be performed with the use of a homodisper, which is a high-speed disperser.

In the present embodiment, the positive-electrode active material layers 162 in which the trilithium phosphate 168 is appropriately distributed are formed from the positive-electrode paste produced through the positive-electrode paste producing step illustrated in FIG. 4. Specifically, each positive-electrode active material layer 162 in the present embodiment exhibits a dispersion index value C of 0.8 or less. The dispersion index value C is a value regarding the trilithium phosphate 168, and calculated through a procedure illustrated in FIG. 5. The procedure for calculating the dispersion index value C in the present embodiment will be described with reference to FIG. 5.

Figure 5:
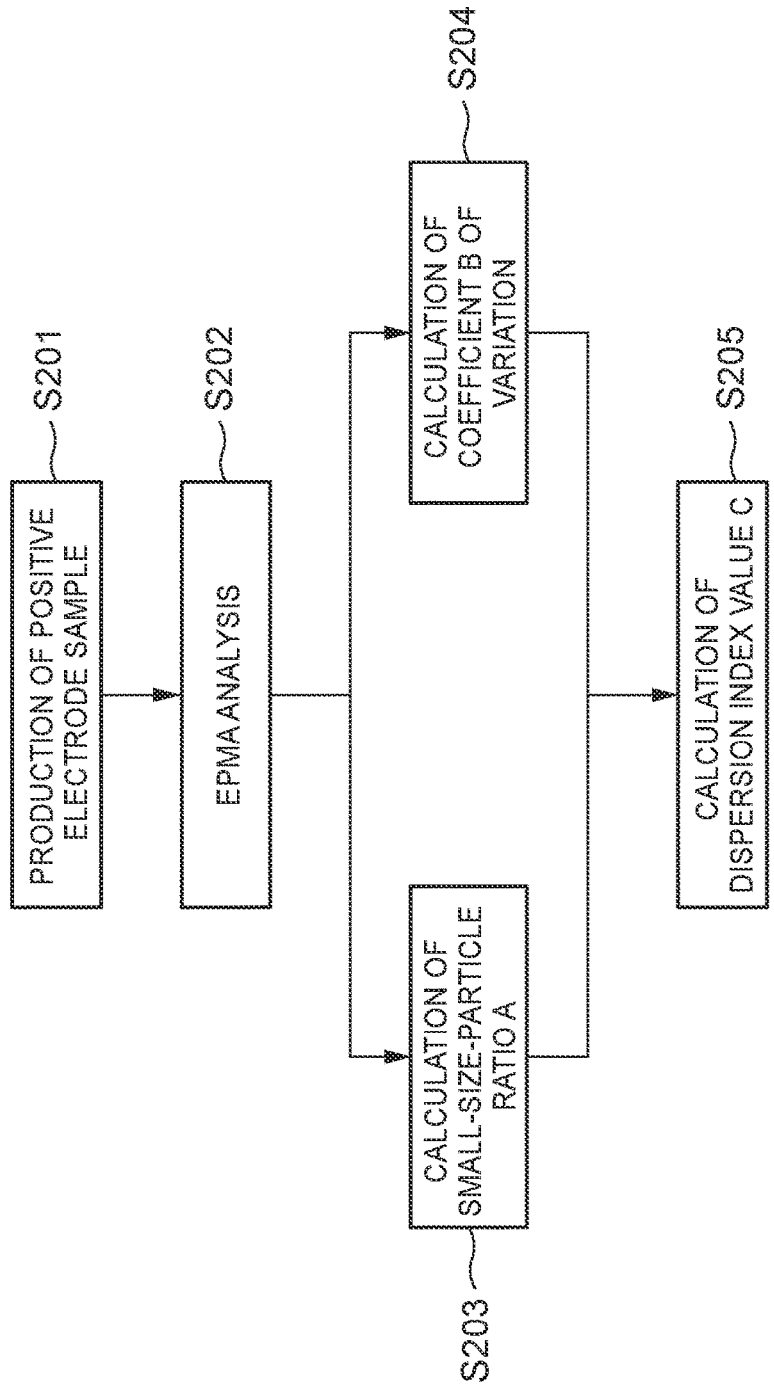
FIG. 5 is a flowchart illustrating the procedure for calculating a dispersion index value.

As illustrated in FIG. 5, a positive electrode sample is prepared in order to calculate the dispersion index value C (S201). As the positive electrode sample, the positive-electrode plate 160 produced through the positive-electrode plate producing step (S102 in FIG. 3) is used. Specifically, the positive-electrode plate 160 that is produced through the positive-electrode plate producing step (S102 in FIG. 3) and that has not been subjected to the assembly step (S103 in FIG. 3) is cut in its thickness direction, and the cut positive-electrode plate 160 is used as the positive electrode sample. The positive-electrode plate 160 may be cut by, for example, ion milling.

Figure 6:
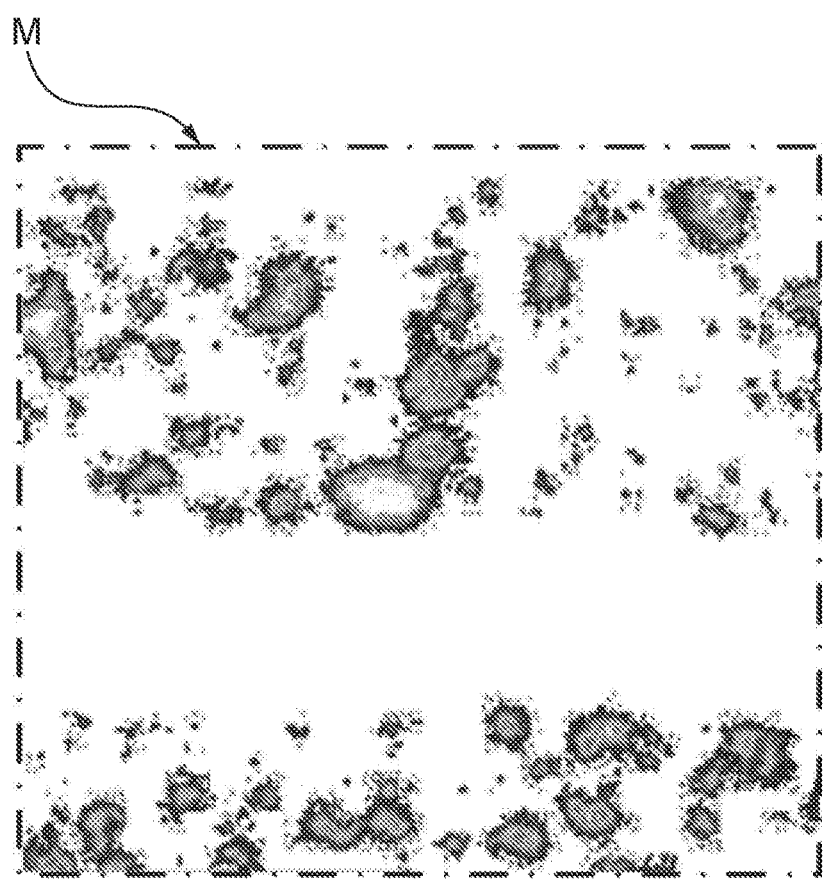
FIG. 6 is a view illustrating the image data of an analyzed region subjected to analysis performed by an electron probe microanalyzer (EPMA)

Next, the section of the cut positive-electrode plate 160 is analyzed by an electron probe microanalyzer (EPMA) (S202). Specifically, the EPMA performs detection of phosphorus (P) at multiple spots in the section of the positive-electrode active material layer 162 of the positive-electrode plate 160. FIG. 6 illustrates the image data of an analyzed region M of the positive-electrode active material layer 162 of the positive-electrode plate 160 according to the present embodiment, which is obtained through analysis performed by the EPMA.

In the present embodiment, among the materials contained in the positive-electrode active material layer 162, only the trilithium phosphate 168 contains phosphorus (P). Thus, detection of the trilithium phosphate 168 is performed by performing detection of phosphorus (P) in the analyzed region M of the positive-electrode active material layer 162.

In the present embodiment, for each analyzed spot in the analyzed region M of the positive-electrode active material layer 162, a detected intensity expressed by 128 levels of gradation (the minimum level of detected intensity is 0, and the maximum level of detected intensity is 127) is obtained through analysis performed by the EPMA. An analyzed spot containing a larger amount of phosphorus (P) (detection target) exhibits a higher detected intensity, which is obtained through analysis performed by the EPMA.

Next, as illustrated in FIG. 5, a small-size-particle ratio A is calculated based on the detected intensities obtained through analysis performed by the EPMA (S203). The small-size-particle ratio A is calculated from the number An1 of phosphorus (P)-containing spots A1 among the analyzed spots, and the number An2 of small-size-particle-containing spots A2 among the phosphorus (P)-containing spots A1. In each of the small-size-particle-containing spots A2, the detected intensity of phosphorus (P) is equal to or lower than a prescribed threshold intensity At. Specifically, the small-size-particle ratio A is calculated by Expression (1).

$$A = An2/An1 \quad (1)$$

In the present embodiment, among the analyzed spots subjected to analysis performed by the EPMA, the analyzed spots exhibiting a detected intensity of 8 or higher are defined as the phosphorus-containing spots A1. In the present embodiment, the lower limit of detected intensity for the phosphorus-containing spots A1 is set to 8, and analyzed spots exhibiting a detected intensity of lower than 8 are not counted as the phosphorus-containing spots A1. Detection of phosphorus (P) in the analyzed spots exhibiting a detected intensity of lower than 8 is regarded as a detected value due to, for example, noise. Thus, in the present embodiment, among the analyzed spots subjected to analysis performed by the EPMA, the analyzed spots exhibiting a detected intensity of 8 to 127 are defined as the phosphorus-containing spots A1.

In the present embodiment, the threshold intensity At is a detected intensity of particles of the trilithium phosphate 168 having a particle size of 1 μm. Specifically, in the present embodiment, the frequency distribution of the particles of the trilithium phosphate 168 is obtained for each of the detected intensities expressed by 128 levels of gradation, which are obtained through analysis performed on the analyzed region M by the EPMA. Then, among the detected intensities, the detected intensity at which an arithmetic mean particle size in the obtained frequency distribution is 1 μm is used as the threshold intensity At. In the present embodiment, the frequency distribution of the particles of the trilithium phosphate 168 for each detected intensity obtained through the analysis performed by the EPMA, is obtained by measuring the sizes of the particles of the trilithium phosphate 168 from the image of the analyzed region M, and classifying the measured particle sizes by detected intensity. In the present embodiment, the particle size of the particles of the trilithium phosphate 168 is obtained by measuring the distance between the farthest two points on the contour of each of the particles of the trilithium phosphate 168 in the image of the analyzed region M. Specifically, in the present embodiment, the threshold intensity At is set to 47. That is, in the present embodiment, among the analyzed spots subjected to analysis performed by the EPMA, the analyzed spots exhibiting a detected intensity of 8 to 47 are defined as the small-size-particle-containing spots A2.

A higher value of the small-size-particle ratio A indicates a higher proportion of the particles of the trilithium phosphate 168 having a particle size of 1 μm or less in the particles of the trilithium phosphate 168 in the analyzed region M. In other words, a higher value of the small-size-particle ratio A indicates a higher proportion of the small particles of the trilithium phosphate 168 having a particle size of 1 μm or less in the positive-electrode active material layer 162.

Figure 7:
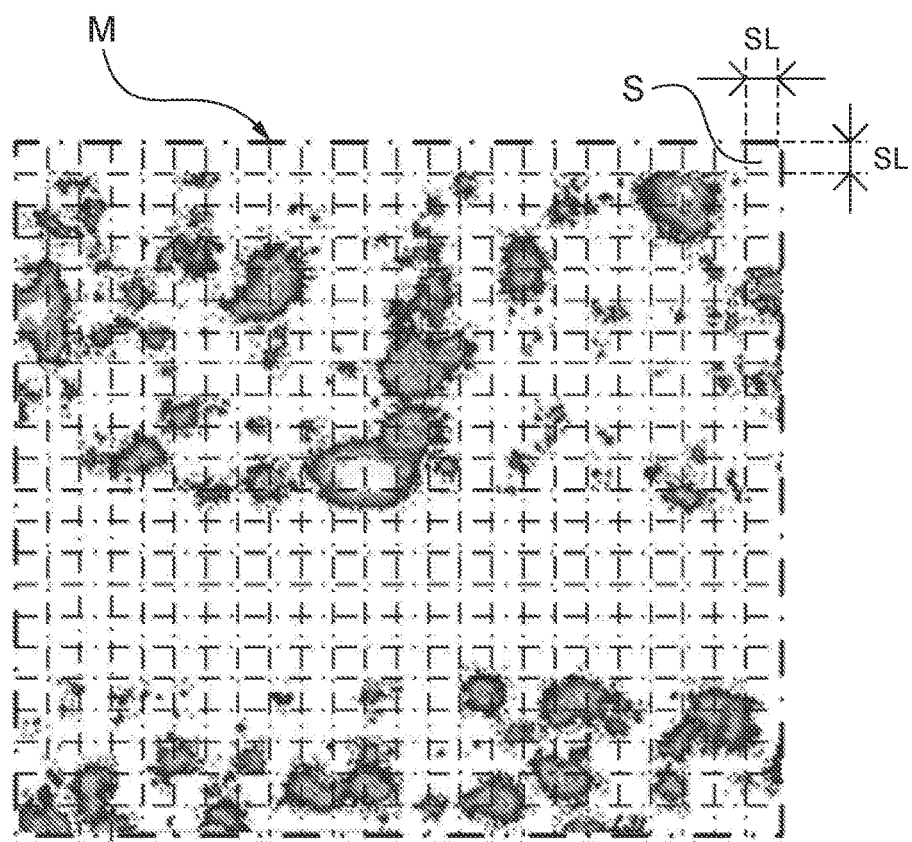
FIG. 7 is a view illustrating segmented regions obtained through segmentation of the analyzed region subjected to analysis performed by the EPMA.

Next, as illustrated in FIG. 5, a coefficient B of variation is calculated based on the detected intensities obtained through analysis performed by the EPMA (S204). Specifically, the coefficient B of variation is calculated as follows. For each of multiple segmented regions S obtained through segmentation of the analyzed region M as illustrated in FIG. 7, a segmented-region accumulated value is calculated. The segmented-region accumulated value is the sum of the detected intensities of the phosphorus-containing spots A1 in the segmented region S. Then, the coefficient B of variation is calculated from an arithmetic mean μ of the segmented-region accumulated values and a standard deviation σ of the segmented-region accumulated values. Specifically, the coefficient B of variation is calculated by Expression (2).

$$B = \sigma/\mu \qquad (2)$$

As illustrated in FIG. 7, the analyzed region M is divided into the multiple segmented regions S such that each segmented region S includes one or more analyzed spots. In the present embodiment, each of all the segmented regions S has a square shape. In the present embodiment, a length SL of one side of each segmented region S is set on the basis of the size of the positive-electrode active material 165.

Specifically, the length SL of one side of each segmented region S is set to a value within a range from half the mean particle size D50 of the positive-electrode active material 165 to five times the mean particle size D50 of the positive-electrode active material 165 (i.e., within a range from a value obtained by dividing the mean particle size D50 by two, to a value obtained by multiplying the mean particle size D50 by five). As described above, in the present embodiment, a positive-electrode active material having a mean particle size D50 of 5 μm is used as the positive-electrode active material 165. Thus, in the present embodiment, the length SL of one side of each segmented region S is set to 3 μm.

A lower value of the coefficient B of variation indicates more even distribution of the trilithium phosphate 168 among the multiple segmented regions S of the analyzed region M. That is, a lower value of the coefficient B of variation indicates more even distribution of the trilithium phosphate 168 in the positive-electrode active material layer 162.

As described above, in the present embodiment, the length SL of one side of each segmented region S is set to a value within a range from half the mean particle size D50 of the positive-electrode active material 165 to five times the mean particle size D50 of the positive-electrode active material 165. Thus, in the present embodiment, a lower value of the coefficient B of variation indicates a higher probability that the particles of the trilithium phosphate 168 are present around the particles of the positive-electrode active material 165.

Next, as illustrated in FIG. 5, the dispersion index value C is calculated (S205) from the small-size-particle ratio A calculated in step S203 and the coefficient B of variation calculated in step S204. The dispersion index value C is calculated by Expression (3).

$$C = B/A^3 \qquad (3)$$

A lower dispersion index value C indicates a higher proportion of the small particles of the trilithium phosphate 168 having a particle size of 1 μm or less in the positive-electrode active material layer 162, and indicates more even distribution of the trilithium phosphate 168 in the positive-electrode active material layer 162. That is, in the positive-electrode active material layer 162 exhibiting a low dispersion index value C, a larger amount of the particles of the trilithium phosphate 168 having a small particle size is present, and the particles of the trilithium phosphate 168 are more evenly distributed.

Thus, a lower dispersion index value C indicates that the particles of the trilithium phosphate 168 are more appropriately distributed in the positive-electrode active material layer 162 of the positive-electrode plate 160. Further, a lower dispersion index value C of the positive-electrode active material layer 162 indicates that the particles of the trilithium phosphate 168 are more appropriately distributed in the positive-electrode paste produced through the positive-electrode paste producing step. As described above, the dispersion index value C is a low value of 0.8 or less in the present embodiment. Thus, in the positive-electrode active material layer 162 of the positive-electrode plate 160 according to the present embodiment, small particles of the trilithium phosphate 168 are appropriately distributed.

In the present embodiment, the mean particle size D50 of the particles of the trilithium phosphate 168 is adjusted in advance to 1.5 μm or less through the particle-size reducing process. Due to reduction in the mean particle size D50 of the particles of the trilithium phosphate 168, the positive-electrode active material layer 162 exhibiting a dispersion index value C of 0.8 or less is appropriately formed. This is because particles of the trilithium phosphate 168 having a smaller particle size are more appropriately distributed without imbalances in the positive-electrode paste.

Further, in the present embodiment, the length SL of one side of each segmented region S is set to a value within a range from half the mean particle size D50 of the positive-electrode active material 165 to five times the mean particle size D50 of the positive-electrode active material 165, as described above. Thus, in the positive-electrode active material layer 162 exhibiting a low dispersion index value C of 0.8 or less in the present embodiment, there is a high probability that the particles of the trilithium phosphate 168 are present around the particles of the positive-electrode active material 165.

As illustrated in Expression (3), the cube of the small-size-particle ratio A is used to calculate the dispersion index value C under the assumption that the particles of the trilithium phosphate 168 has a spherical form and based on the fact that the cube of the small-size-particle ratio A indicating a volume is correlated with the dispersion index value of the particles of the trilithium phosphate 168.

As described above, in the present embodiment, the positive-electrode active material 165 is $LiNi_{0.5}Mn_{1.5}O_4$ with a maximum operating electric potential of 4.35 V or higher with respect to an electric potential of metallic lithium. Thus, the positive-electrode active material 165 exhibits an operating electric potential of 4.35 V or higher with respect to the electric potential of the metallic lithium in the initial charging step (S104 in FIG. 3).

On the surface of the positive-electrode active material 165 in the positive-electrode active material layer 162, in which the electric potential is raised to 4.35 V or higher, the solvent components, such as EC, contained in the electrolyte 120 undergo oxidative decomposition to generate hydrogen ions. The generated hydrogen ions react with fluorine ions contained in the electrolyte 120 to generate hydrofluoric acid (HF). The generated hydrofluoric acid reacts with the trilithium phosphate 168 contained in the positive-electrode active material layer 162. Thus, the trilithium phosphate 168 contained in the positive-electrode active material layer 162 functions as an acid-consuming material.

As described above, the positive-electrode active material layer 162 according to the present embodiment contains small particles of the trilithium phosphate 168 of which the mean particle size D50 is adjusted to 1.5 μm or less through the particle-size reducing process. The positive-electrode active material layer 162 exhibits a dispersion index value C of 0.8 or less, and therefore contains a large amount of small particles of the trilithium phosphate 168 having a particle size of 1 μm or less. That is, in the positive-electrode active material layer 162 according to the present embodiment, the total surface area of the particles of the trilithium phosphate 168, which has a small particle size, is greater than that in a case where the particle size is large.

In addition, the positive-electrode active material layer 162 according to the present embodiment exhibits a dispersion index value C of 0.8 or less, and therefore the particles of the trilithium phosphate 168 are evenly distributed in the positive-electrode active material layer 162. Thus, in the positive-electrode active material layer 162 according to the present embodiment, the reaction frequency with which the trilithium phosphate 168 reacts with hydrofluoric acid is high. Thus, in the present embodiment, the trilithium phosphate 168 reliably functions as an acid-consuming material.

When the trilithium phosphate 168 reacts with hydrofluoric acid, a coating film is formed on the surface of the positive-electrode active material 165. The coating film formed on the surface of the positive-electrode active material 165 contains fluorine (F) and phosphorus (P). Specifically, the coating film is considered to contain a fluorine-containing compound (more specifically, a fluorine compound, such as LiF) and a phosphorus-containing compound (more specifically, a compound containing phosphate ions, such as $Li_3PO_4$, $Li_2HPO_4$, $LiH_2PO_4$, or $H_3PO_4$).

When the coating film is formed on the surface of the positive-electrode active material 165, further oxidative decomposition of the solvent components contained in the electrolyte 120 on the surface of the positive-electrode active material 165 is inhibited. Further, when the protective coating film is formed, elution of the transition metal from the positive-electrode active material 165 is inhibited. That is, the coating film formed through the reaction of the trilithium phosphate 168 with hydrofluoric acid functions as a protective coating film.

In the present embodiment, the reaction frequency with which the trilithium phosphate 168 reacts with hydrofluoric acid is high as described above, and thus the protective coating film is reliably formed on the surface of the positive-electrode active material 165. In the present embodiment, the durability of the battery 100 is further enhanced by reliably forming the protective coating film on the surface of the positive-electrode active material 165.

Further, because the reaction frequency with which the trilithium phosphate 168 reacts with hydrofluoric acid is high, the protective coating film is formed within a short period of time. Further, because the reaction frequency with which the trilithium phosphate 168 reacts with hydrofluoric acid is high, a highly-conductive and high-quality coating film is formed on the surface of the positive-electrode active material 165. As a result, the internal resistance of the battery 100 is reduced.

In contrast to this, when the dispersion index value C is high and thus the particle size of the particles of the trilithium phosphate 168 in the positive-electrode active material layer 162 is excessively large or the particles of the trilithium phosphate 168 cling together into agglomerations, the reaction frequency with which the trilithium phosphate 168 reacts with hydrofluoric acid is likely to be lowered. In addition, when the dispersion index value C is high and thus the particles of the trilithium phosphate 168 are not appropriately dispersed, the reaction frequency with which the trilithium phosphate 168 reacts with hydrofluoric acid is likely to be lowered. In these cases, the trilithium phosphate 168 may fail to appropriately function as an acid-consuming material. Further, a protective coating film may fail to be appropriately formed on the surface of the positive-electrode active material 165. Moreover, it may take a long period of time to form the protective coating film. In addition, when the conductivity of the protective coating film on the surface of the positive-electrode active material 165 is lowered, the internal resistance of the battery 100 may be increased.

As described above, hydrogen ions are generated through the oxidative decomposition of the solvent components contained in the electrolyte 120 on the surface of the positive-electrode active material 165. Thus, the spots where hydrofluoric acid is generated through the reaction of hydrogen ions with fluorine ions contained in the electrolyte 120 are near the surface of the positive-electrode active material 165 in the positive-electrode active material layer 162.

As described above, the dispersion index value C in the present embodiment is calculated from the coefficient B of variation that is calculated on the condition that the length SL of one side of each segmented region S is set to a value within a range from half the mean particle size D50 of the positive-electrode active material 165 to five times the mean particle size D50 of the positive-electrode active material 165. In addition, because the dispersion index value C is 0.8 or less, the probability that the particles of the trilithium phosphate 168 are present around the particles of the positive-electrode active material 165 is high in the positive-electrode active material layer 162 according to the present embodiment. Thus, in the positive-electrode active material layer 162 according to the present embodiment, there is a high probability that the trilithium phosphate 168 is present near the surface of the positive-electrode active material 165 where hydrofluoric acid is generated.

In the present embodiment, the reaction frequency with which the trilithium phosphate 168 reacts with hydrofluoric acid is enhanced, and thus the trilithium phosphate 168 reliably functions as an acid-consuming material. In addition, a protective coating film is more reliably formed on the surface of the positive-electrode active material 165 within a shorter period of time. Further, the conductivity of the protective coating film on the surface of the positive-electrode active material 165 is increased. That is, in the present embodiment, the distribution of the trilithium phosphate 168 in the positive-electrode active material layer 162 is set such that the trilithium phosphate 168 and hydrofluoric acid generated near the surface of the positive-electrode active material 165 appropriately react with each other.

Second Embodiment

Next, a second embodiment will be described. A battery 100 according to the second embodiment has the same configuration as that of the first embodiment described with reference to FIG. 1 and FIG. 2. Further, the battery 100 according to the second embodiment is produced through the procedure illustrated in FIG. 3. In the present embodiment, the procedure for producing a positive-electrode paste in the positive-electrode paste producing step (S101 in FIG. 3) differs from that in the first embodiment described with reference to FIG. 4. Therefore, the procedure for producing a positive-electrode paste in the positive-electrode paste producing step in the present embodiment will be described in detail below.

Figure 8:
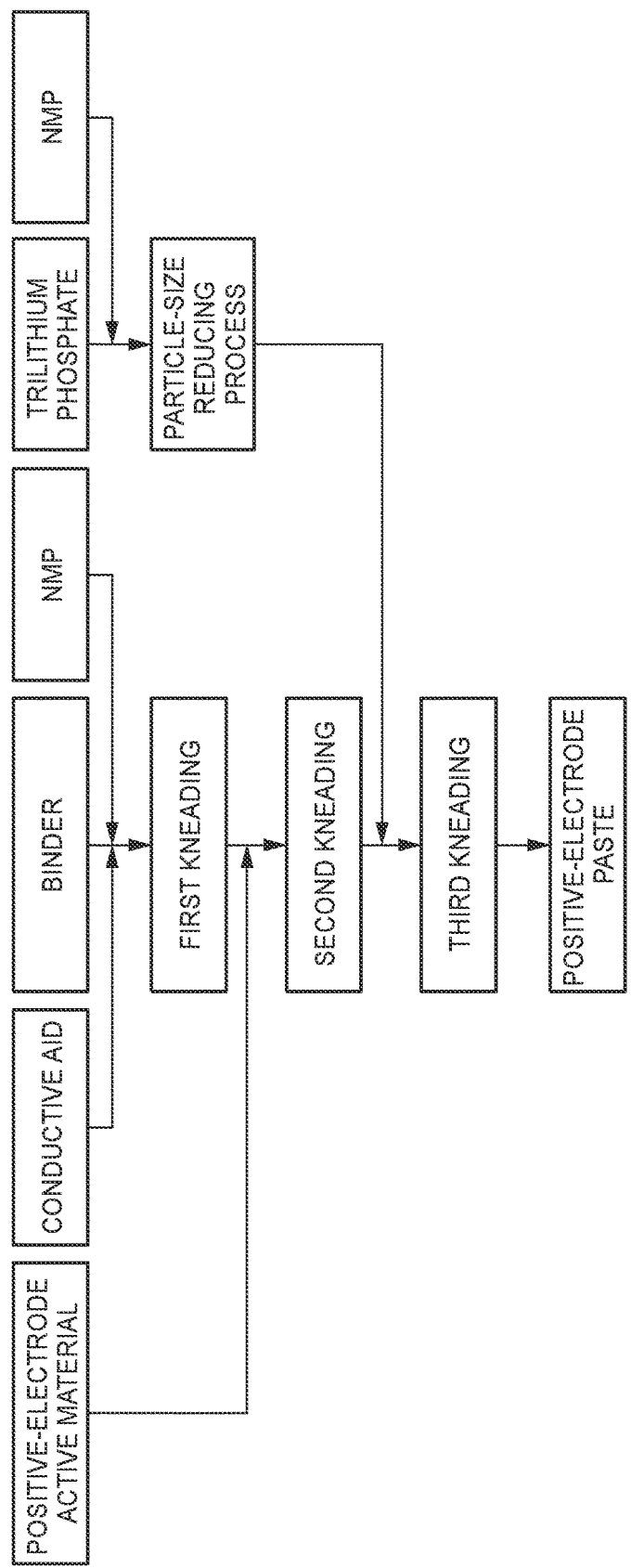
FIG. 8 is a diagram illustrating the procedure of a positive-electrode paste producing step according to a second embodiment.

FIG. 8 illustrates the procedure of the positive-electrode paste producing step in the present embodiment. As illustrated in FIG. 8, in the present embodiment as well, first, the positive-electrode active material 165, the conductive aid 166, the binder 167, and the trilithium phosphate 168 used in the positive-electrode paste are provided. Each of the positive-electrode active material 165, the conductive aid 166, the binder 167, and the trilithium phosphate 168 is in the form of powder, as in the first embodiment.

As illustrated in FIG. 8, in the present embodiment, the first kneading and the second kneading are performed in the same manner as that in the first embodiment. Specifically, in the first kneading, the conductive aid 166 and the binder 167, both of which are in the form of powder, are mixed with NMP serving as a solvent, and kneading is performed. In the second kneading, the positive-electrode active material 165 in the form of powder is mixed with the paste produced through the first kneading, and kneading is performed.

In the third kneading in the present embodiment, the trilithium phosphate 168 is mixed with the paste produced through the second kneading and kneading is performed, as in the first embodiment. In the present embodiment as well, the trilithium phosphate 168 in the form of powder, which is mixed with the paste in the third kneading, has been subjected to a particle-size reducing process, as illustrated in FIG. 8. In the particle-size reducing process in the present embodiment, the particles of the trilithium phosphate 168 are disintegrated or pulverized.

Unlike in the first embodiment, the particle-size reducing process is performed with the trilithium phosphate 168 in the form of powder mixed with a solvent in the present embodiment. The solvent used in the particle-size reducing process may be NMP used for the production of the positive-electrode paste. That is, the present embodiment differs from the first embodiment in that the particle-size reducing process is performed with the trilithium phosphate 168 mixed with the solvent.

In the particle-size reducing process according to the present embodiment as well, the mean particle size D50 of the particles of the trilithium phosphate 168 is adjusted to 1.5 µm or less. In the present embodiment, the particle-size reducing process may be performed with the use of a wet atomization unit, such as a wet bead mill.

In the present embodiment as well, the trilithium phosphate 168 is trilithium phosphate of which the mean particle size D50 is adjusted to 1.5 µm or less through the particle-size reducing process. The mean particle size D50 of the trilithium phosphate 168 is expressed by a median size, that is, a particle size at an accumulated value of 50% in a particle size distribution obtained by the laser diffraction scattering method.

In the present embodiment, the trilithium phosphate 168 that has been subjected to the particle-size reducing process is mixed with the paste obtained through the second kneading, in the form of a trilithium phosphate-containing paste dispersed in NMP through the particle-size reducing process. Through the third kneading performed with the trilithium phosphate-containing paste mixed with the paste obtained through the second kneading, a positive-electrode paste in which the positive-electrode active material 165, the conductive aid 166, the binder 167, and the trilithium phosphate 168 are appropriately dispersed in NMP is produced.

In the positive-electrode paste producing step according to the present embodiment as well, the first kneading, the second kneading, and the third kneading need not be performed independently from each other. That is, the first kneading, the second kneading, and the third kneading may be performed with the use of a kneader while the materials and the trilithium phosphate-containing paste are sequentially supplied into the kneader. In the present embodiment as well, kneading in the positive-electrode paste producing step may be performed with the use of a homodisper, which is a high-speed disperser.

In the present embodiment as well, the particle size of the particles of the trilithium phosphate 168 is made small through the particle-size reducing process, and thus the trilithium phosphate 168 is appropriately distributed in the positive-electrode active material layer 162 formed from the positive-electrode paste.

Thus, in the present embodiment as well, each positive-electrode active material layer 162 after formation exhibits a dispersion index value C of 0.8 or less. The dispersion index value C is a value regarding the trilithium phosphate 168, and calculated through the procedure illustrated in FIG. 5. In the present embodiment, the procedure for calculating the dispersion index value C is the same as that in the first embodiment described above with reference to FIG. 5.

Further, in the particle-size reducing process according to the present embodiment, the particles of the trilithium phosphate 168 are pulverized or disintegrated in the solvent. Thus, the particles of the trilithium phosphate 168 are dispersed in the solvent while being pulverized or disintegrated. Therefore, in the present embodiment, agglomeration of the particles of the trilithium phosphate 168 in the positive-electrode paste is inhibited more reliably than in the first embodiment in which the particles of the trilithium phosphate 168 in the form of powder are pulverized or disintegrated in a dry state. That is, the particles of the trilithium phosphate 168 are more evenly dispersed in the positive-electrode paste.

The dispersion index value C of the positive-electrode active material layer 162 formed from the positive-electrode paste produced through the positive-electrode paste producing step according to the present embodiment is made lower than the dispersion index value C of the positive-electrode active material layer 162 formed from the positive-electrode paste produced through the positive-electrode paste producing step according to the first embodiment.

In the present embodiment as well, the positive-electrode active material 165 is $LiNi_{0.5}Mn_{1.5}O_4$ with a maximum operating electric potential of 4.35 V or higher with respect to an electric potential of metallic lithium. Thus, the positive-electrode active material 165 exhibits an operating electric potential of 4.35 V or higher with respect to the electric potential of the metallic lithium in the initial charging step (S104 in FIG. 3). Thus, in the present embodiment as well, hydrofluoric acid (HF) is generated near the surface of the positive-electrode active material 165 in the positive-electrode active material layer 162 in the initial discharging step.

As described above, the positive-electrode active material layer 162 according to the present embodiment exhibits a dispersion index value C that is lower than that in the first embodiment, and thus the particles of the trilithium phosphate 168 are more evenly distributed in the positive-electrode active material layer 162. Thus, in the positive-electrode active material layer 162 according to the present embodiment, the reaction frequency with which the trilithium phosphate 168 reacts with hydrofluoric acid is further increased. Thus, in the present embodiment, the trilithium phosphate 168 reliably more reliably functions as an acid-consuming material.

Further, as described above, in the present embodiment, because the reaction frequency with which the trilithium phosphate 168 reacts with hydrofluoric acid is higher, a protective coating film is formed on the surface of the positive-electrode active material 165 through the reaction more reliably than in the first embodiment. Further, the protective coating film is formed on the surface of the positive-electrode active material 165 within a shorter period of time than in the first embodiment. In addition, the protective coating film on the positive-electrode active material 165 exhibits a conductivity higher than that in the first embodiment.

Further, in the present embodiment as well, the dispersion index value C is calculated from the coefficient B of variation that is calculated on the condition that the length SL of one side of each segmented region S is set to a value within a range from half the mean particle size D50 of the positive-electrode active material 165 to five times the mean particle size D50 of the positive-electrode active material 165. In addition, the dispersion index value C is preferably 0.8 or less. In such a positive-electrode active material layer 162, there is a high probability that the particles of the trilithium phosphate 168 are present around the particles of the positive-electrode active material 165 where hydrofluoric acid is generated. That is, the reaction frequency with which the trilithium phosphate 168 reacts with hydrofluoric acid is further increased.

Evaluation of Advantageous Effects

The inventors et al. performed experiments as described below to evaluate the advantageous effects of the invention. In the experiments, batteries of Examples 1, 2 corresponding to the battery 100 were produced by the method described in the second embodiment. Further, a battery of Comparative Example was produced for comparison.

The batteries of Examples 1, 2 and the battery of Comparative Example have the same configurations except the positive-electrode active material layer of the positive-electrode plate. More specifically, the batteries of Examples 1, 2 and the battery of Comparative Example differ from each other in the mean particle size D50 of trilithium phosphate mixed with the positive-electrode paste in the positive-electrode paste producing step. Further, the batteries of Examples 1, 2 and the battery of Comparative Example also differ from each other in the dispersion index value of the positive-electrode active material layer of the positive-electrode plate produced through the positive-electrode plate producing step. Table 1 shows the mean particle size D50 of trilithium phosphate and the dispersion index value in Examples 1, 2 and Comparative Example.

TABLE 1

|  | Mean particle size D50 of trilithium phosphate | Dispersion index value |
| --- | --- | --- |
| Example 1 | 1.5 μm (After particle-size reducing process) | 0.8 |
| Example 2 | 0.2 μm (After particle-size reducing process) | 0.7 |
| Comparative Example | 3 μm | 2.7 |

As illustrated in Table 1, in Examples 1, 2, trilithium phosphate having a mean particle size D50 of 1.5 μm or less was used in the positive-electrode paste producing step. Further, in the positive-electrode plates in Examples 1, 2, the positive-electrode active material layers exhibit a dispersion index value of 0.8 or less. In contrast to this, in Comparative Example, trilithium phosphate having a mean particle size D50 exceeding 1.5 μm was used in the positive-electrode paste producing step. In the positive-electrode plate in Comparative Example, the positive-electrode active material layer exhibits a dispersion index value exceeding 0.8.

In Comparative Example, a positive-electrode active material layer was formed from a positive-electrode paste produced from trilithium phosphate in the form of powder, which has not been subjected to the particle-size reducing process, in the experiment.

In contrast to this, in Examples 1, 2, a positive-electrode active material layer was formed from a positive-electrode paste produced from trilithium phosphate which has been subjected to the particle-size reducing process in a solvent. That is, the batteries of Examples 1, 2 correspond to the battery according to the second embodiment. The trilithium phosphate in the form of powder before the particle-size reducing process used in Examples 1, 2 is the same as that used in Comparative Example.

Figure 9:
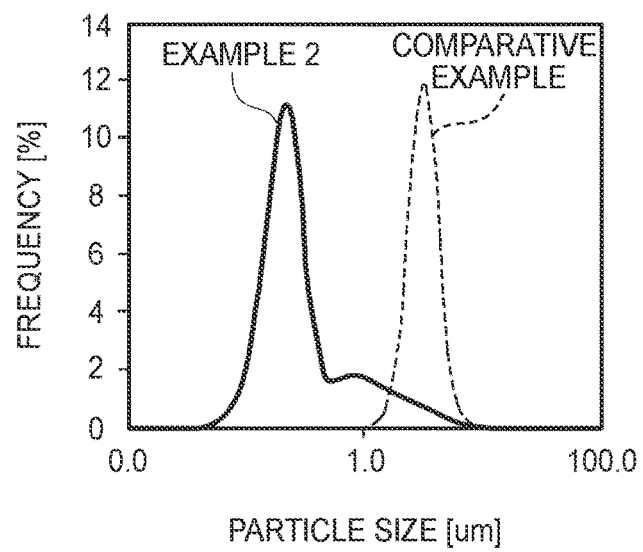
FIG. 9 is a graph illustrating the frequency distributions of trilithium phosphate in Example 2 and Comparative Example.

In FIG. 9, the frequency distribution of trilithium phosphate used in Comparative Example is indicated by a dashed line, and the frequency distribution of particulate trilithium phosphate after the particle-size reducing process and used in Example 2 is indicated by a continuous line. As illustrated in FIG. 9, the particulate trilithium phosphate used in Example 2 was reduced in size through the particle-size reducing process.

Figure 10:
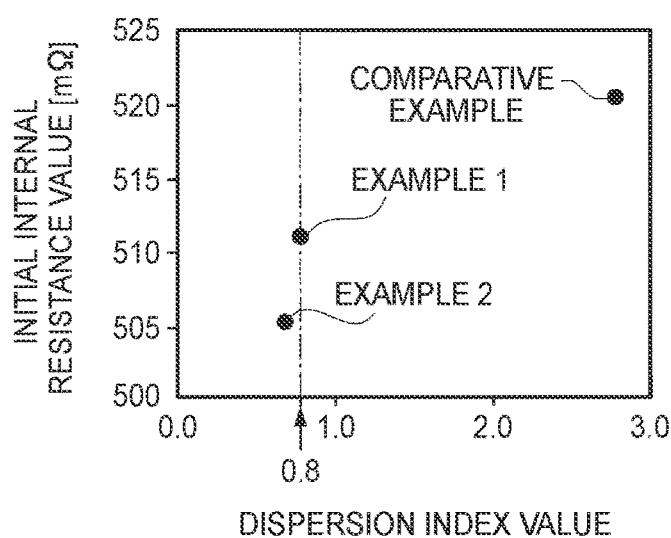
FIG. 10 is a graph illustrating the initial internal resistance values of batteries in Examples 1, 2 and Comparative Example.

FIG. 10 illustrates the initial internal resistance values of the batteries of Examples 1, 2 and Comparative Example. The initial internal resistance values of the batteries of Examples 1, 2 and Comparative Example were obtained by measuring the internal resistances of the batteries after the initial charging step.

As illustrated in FIG. 10, each of the batteries of Examples 1, 2, which includes the positive-electrode active material layer exhibiting a dispersion index value of 0.8 or less, exhibits an initial internal resistance value that is lower than that of the battery of Comparative Example, which includes the positive-electrode active material layer exhibiting a dispersion index value exceeding 0.8. The battery of Example 2 includes the positive-electrode active material layer exhibiting a dispersion index value lower than that of the positive-electrode active material layer of the battery of Example 1. As illustrated in FIG. 10, the initial internal resistance value of the battery of Example 2 exhibiting a lower dispersion index value is lower than that of the battery of Example 1 exhibiting a higher dispersion index value. That is, FIG. 10 indicates that the lower the dispersion index value is, the lower the initial internal resistance value is.

This is considered to be attributed to the fact that the lower the dispersion index value, the higher the reaction frequency with which trilithium phosphate and hydrofluoric acid react with each other in the positive-electrode active material layer. Specifically, as the dispersion index value becomes lower, the reaction frequency with which trilithium phosphate and hydrofluoric acid react with each other becomes higher and a higher-quality coating film having a higher conductivity is formed on the surface of the positive-electrode active material. Thus, it is considered that the lower the dispersion index value is, the lower the initial internal resistance value of the battery is.

As described above in detail, the positive-electrode plate 160 of the battery 100 according to the foregoing embodiments includes the positive-electrode active material layers 162 in which a dispersion index value C of the trilithium phosphate 168 is 0.8 or less. Each positive-electrode active material layer 162 of the positive-electrode plate 160 is formed of a positive-electrode paste that is produced from the trilithium phosphate 168 having a mean particle size D50 of 1.5 μm or less through the positive-electrode paste producing step. Thus, it is possible to achieve a positive-electrode plate for a non-aqueous electrolyte secondary battery, in which trilithium phosphate is appropriately distributed in a positive-electrode active material layer, the non-aqueous electrolyte secondary battery, and a method of producing the non-aqueous electrolyte secondary battery.

The foregoing embodiments are merely examples and should not limit the invention. Therefore, various improvements and modifications may be made to the foregoing embodiments within the scope of the invention. For example, not only the rolled electrode assembly 110 having a flat shape, but also to a rolled electrode assembly having a cylindrical shape may be used. Alternatively, the invention may be applied to a laminated electrode assembly instead of a rolled electrode assembly. Even when a positive-electrode active material with a maximum operating electric potential of less than 4.35 V with respect to an electric potential of metallic lithium is used as the positive-electrode active material 165, the electrolyte 120 slightly undergoes oxidative decomposition to generate hydrogen ions. Thus, the invention may be applied to a case where a positive-electrode active material with a maximum operating electric potential of less than 4.35 V with respect to an electric potential of metallic lithium is used as the positive-electrode active material 165.

In the foregoing embodiments described above, the frequency distribution of the particles of the trilithium phosphate 168 is obtained for each of the detected intensities expressed by 128 levels of gradation, which are obtained through analysis performed on the analyzed region M by the EPMA. Then, among the detected intensities, the detected intensity at which an arithmetic mean particle size in the obtained frequency distribution is 1 μm is used as the threshold intensity At. Alternatively, the threshold intensity At may be obtained in a manner similar to that described above from the results of analysis performed by the EPMA on a sample prepared in advance.

What is claimed is:

1. A method of producing a non-aqueous electrolyte secondary battery including a positive-electrode plate, a negative-electrode plate, a non-aqueous electrolyte containing a fluorine-containing ionic compound, and a battery case in which the positive-electrode plate, the negative-electrode plate, and the electrolyte are accommodated, the positive-electrode plate including a positive-electrode collector foil and a positive-electrode active material layer provided on a surface of the positive-electrode collector foil, the method comprising:
    producing a trilithium phosphate-containing paste by mixing a powder of trilithium phosphate with a first solvent, and then pulverizing or disintegrating the trilithium phosphate while the trilithium phosphate is dispersed in the first solvent to reduce the mean particle size of the trilithium phosphate to 1.5 μm or less;
    producing a positive-electrode paste by mixing a positive-electrode active material, a binder, and the trilithium phosphate-containing paste and adding a second solvent;
    producing the positive-electrode plate by applying the positive-electrode paste to the surface of the positive-electrode collector foil and forming the positive-electrode active material layer by drying the positive-electrode paste applied to the surface of the positive-electrode collector foil;
    assembling the non-aqueous electrolyte secondary battery by accommodating the non-aqueous electrolyte, the positive-electrode plate, and the negative-electrode plate in the battery case; and
    performing initial charging on the assembled non-aqueous electrolyte secondary battery,
    wherein the first solvent has the same composition as the second solvent, and
    wherein the positive-electrode active material layer of the non-aqueous electrolyte secondary battery has a dispersion index value of 0.8 or less.

2. The method according to claim 1, wherein, a positive-electrode active material with a maximum operating electric potential of 4.35 V or higher with respect to an electric potential of metallic lithium is used as the positive-electrode active material.

3. The method according to claim 1, wherein the non-aqueous electrolyte further contains an organic solvent.

4. The method according to claim 1, wherein in the assembling step, the non-aqueous electrolyte is accommodated after the positive-electrode plate and the negative-electrode plate are accommodated in the battery case.

5. The method according to claim 1, wherein N-methylpyrrolidone is used as the solvent and the additional solvent.

* * * * *